United States Patent [19]

Bruecker

[11] 4,373,623

[45] Feb. 15, 1983

[54] SILO DISCHARGE CHUTE

[76] Inventor: George B. Bruecker, Rte. 1, Greenleaf, Wis. 54126

[21] Appl. No.: 250,456

[22] Filed: Apr. 2, 1981

[51] Int. Cl.³ .......................................... B65G 11/02
[52] U.S. Cl. ...................................... 193/14; 52/195; 193/29; 193/34
[58] Field of Search ............... 193/4, 29, 33, 34, 25 R, 193/5, 14, 23; 220/213; 52/195, 196; 414/313-322; 160/352

[56] References Cited

U.S. PATENT DOCUMENTS

| | | | |
|---|---|---|---|
| 2,834,063 | 5/1958 | Rutten | 52/195 X |
| 2,988,238 | 6/1961 | Bruecker | 414/322 |
| 3,063,497 | 11/1962 | Bruecker | 160/352 |
| 3,063,581 | 11/1962 | Bruecker | 414/313 |
| 3,063,585 | 11/1962 | Bruecker | 414/313 |
| 3,071,263 | 1/1963 | Bruecker | 414/313 |
| 3,146,899 | 9/1964 | Bruecker | 414/313 |
| 3,231,106 | 1/1966 | Bruecker | 414/313 |
| 3,961,693 | 6/1976 | Bruecker | 193/14 |
| 4,260,313 | 4/1981 | VanDusen | 52/196 X |

Primary Examiner—John J. Love
Assistant Examiner—Gene A. Church
Attorney, Agent, or Firm—George Wheeler

[57] ABSTRACT

Silo discharge chute forming means, or a silo including such means fixed astride an upright slot opening in its wall. The discharge chute is comprised of a vertically disposed series of doors, each larger than the silo opening but vertically segmented so that each segment can be individually removed through the opening to erect or disassemble the discharge chute. The means for attaching the doors to the silo and supporting the same are suitably attached to the silo wall and can include ladder means to provide access to the top and interior portions of the silo through the usual exterior chute thereof.

12 Claims, 5 Drawing Figures

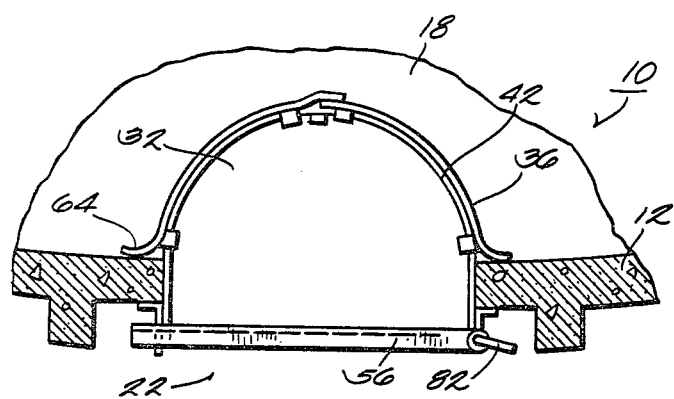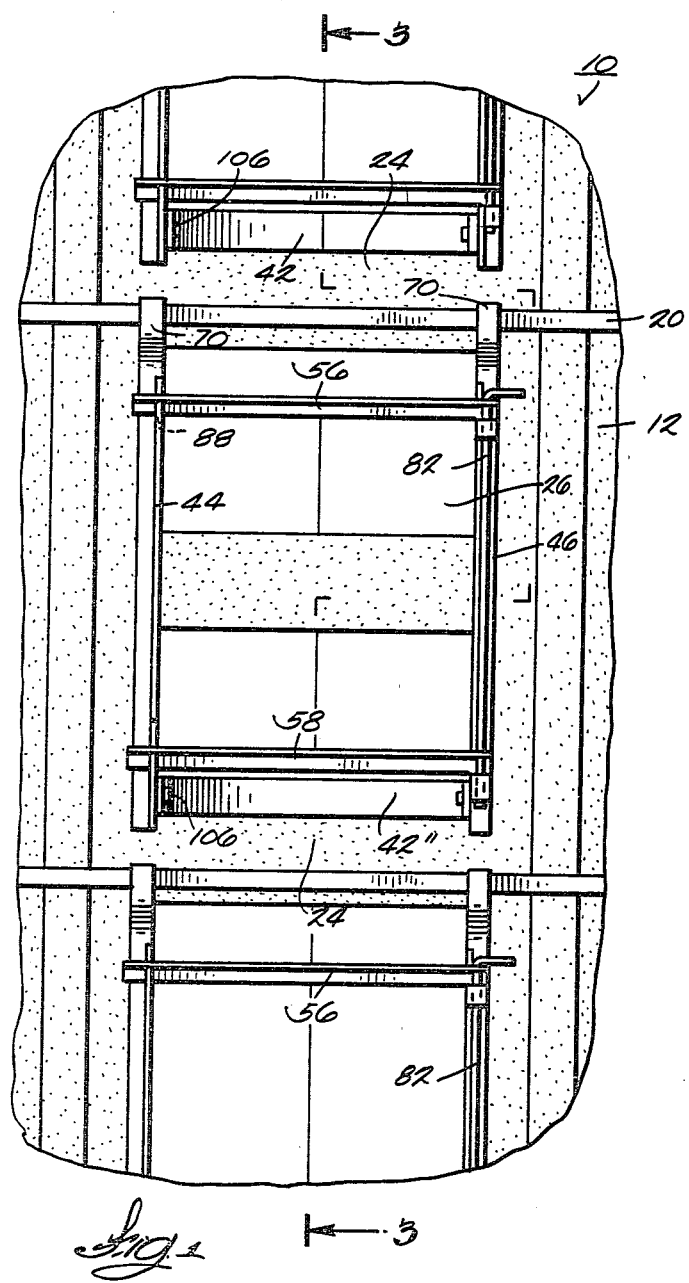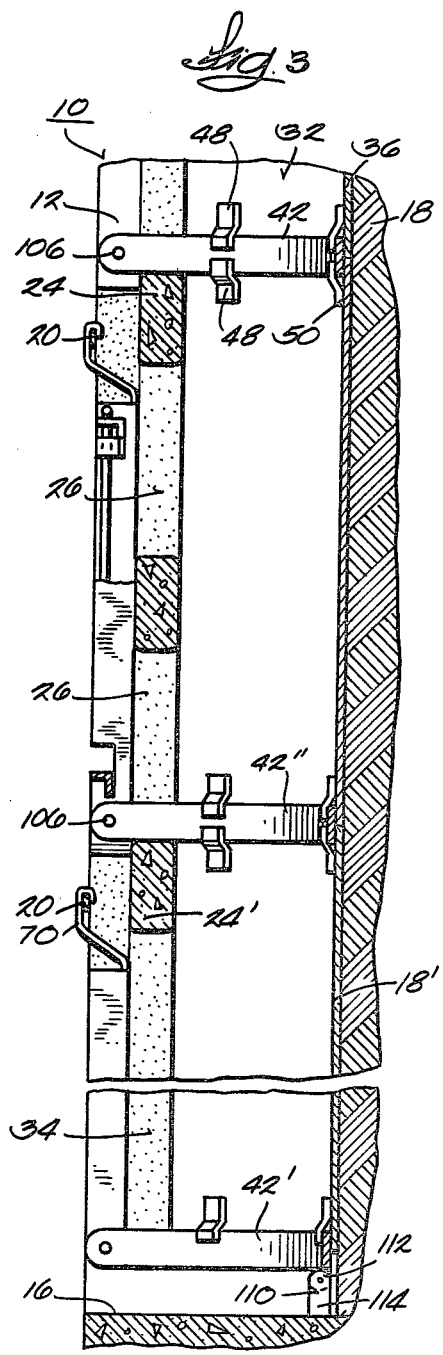

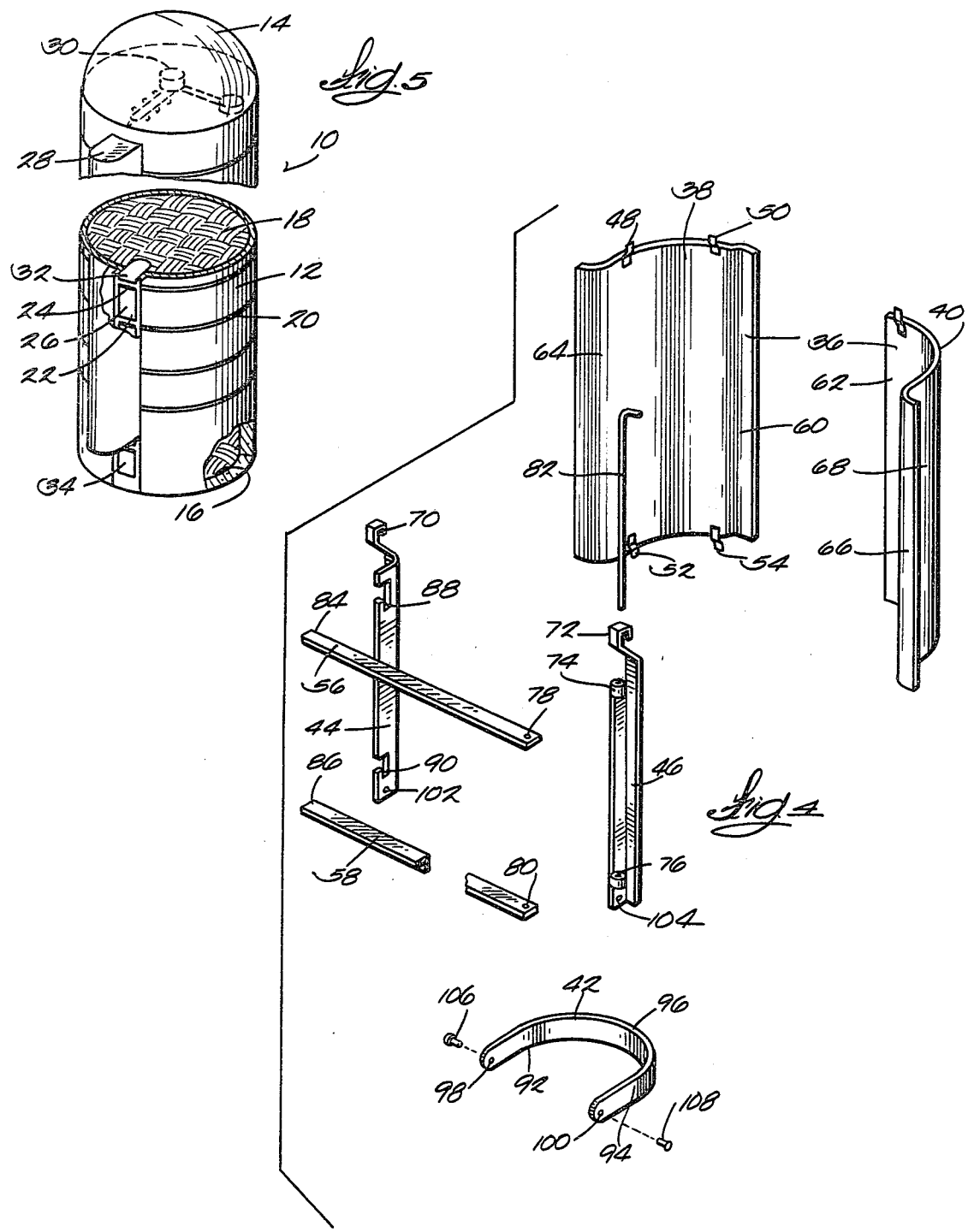

SILO DISCHARGE CHUTE

TECHNICAL FIELD

The present invention relates to means for unloading fodder or forage stored in a silo, and more particularly to means for forming a temporary vertical silo discharge chute between a silo wall and mass of material stored therein.

BACKGROUND ART

Silos are well known agricultural buildings for storing and conditioning fodder or forage in bulk form until it is to be used for animal feed. The silage is typically loaded into the silo by depositing it within the silo from the top. The silage is then unloaded from a working face at the top of the bulk silage, conveyed outside the silo through a vertical opening in the silo wall, and discharged via a vertically disposed chute running down the outside of the silo.

An alternate method of conveying silage from the top of the stack has been to unload it through a vertical chute or passage formed in the silage itself along the inside of the silo wall. Apparatus and a method for forming such an inside discharge chute are disclosed in my U.S. Pat. Nos. 3,063,497, issued Nov. 13, 1962; 3,063,585, issued Nov. 13, 1962; and 3,961,693, issued June 8, 1976. As shown in those patents, such a chute can be formed by positioning a form or torpedo adjacent the inside wall of the silo and lifting the torpedo as the silo is filled to leave a chute in the path of the torpedo. Such chutes are not ideal because they can sometimes collapse or become jammed. Alternately, such a chute can be formed by erecting a vertical series of inwardly bowed doors along the inside wall of the silo adjacent to the discharge opening before the silo is filled. After the silo is filled, the doors level with the working face of the silage are progressively removed to expose the chute as the silo is unloaded. The successive doors of the system must be custom fit to an individual silo construction, and loose hardware needed to assemble and disassemble the chute forming means can become lost or be dropped when doors are assembled or disassembled by a person standing within the conventional discharge chute outside the silo wall.

SUMMARY OF THE INVENTION

The present invention is improved silo discharge chute forming means comprising at least one inwardly bowed door vertically split into segments which are narrower than the upright opening in the silo wall. The assembled door is wider than the opening. Support means comprising a vertically registered pair of normally horizontally supported U-shaped members are provided to support each door astride the opening. Each U-shaped member has a pair of legs for pivotal attachment to either side of the upright opening and a pivotally retractable bight normally extending radially inward through the opening. Means fixed to the upper and lower ends of each door engage the respective U-shaped members to support the doors in place.

In a preferred embodiment of the invention a series of vertically stacked doors is provided, and the adjoining edges of each vertically adjacent pair of doors share a single U-shaped member for support.

BRIEF DESCRIPTION OF DRAWINGS

FIG. 1 is an exterior fragmentary side elevation of the invention attached to a silo wall across an upright opening. The silo exterior chute is removed to show the invention.

FIG. 2 is a plan view of FIG. 1.

FIG. 3 is a fragmentary cross-section taken along line 3—3 of FIG. 1.

FIG. 4 is an exploded view of the parts of the invention in isolation.

FIG. 5 is a fragmentary perspective view on a reduced scale of a typical silo to receive the present invention.

DESCRIPTION OF THE PREFERRED EMBODIMENT

Although the disclosure hereof is detailed and exact to enable those skilled in the art to practice the invention, the physical embodiment herein disclosed merely exemplify the invention which may be embodied in other specific structure. While the best known embodiment has been described, the details may be changed without departing from the invention, which is defined by the claims.

A typical silo 10 (see in particular FIG. 5) comprises a cylindrical wall 12 crowned by a hemispherical roof 14 and support on a floor or foundation 16 to enclose a space for bulk storage of silage 18. Silos commonly include a series of circumferential hoops 20 for support. Silos also conventionally include a vertically disposed slot or opening 22, here divided by sills 24 into a series of smaller vertically spaced openings 26. Opening 22 is straddled on the outside of the silo wall by a permanent exterior chute 28 having a closed top and an open bottom. In some prior art silo unloading devices, this exterior chute is used to convey silage received through opening 22 to receiving means located below the open bottom of chute 28. However, in the present silo unloading means an unloader 30 kept at the exposed top face of the silage feeds silage through a vertical interior chute 32 adjacent to opening 22 for removal to the outside via the lowermost part 34 of opening 22. The present invention relates to the means for forming interior chute 32, known hereinafter as a silo discharge chute.

The silo discharge chute forming means are shown in isolation in FIG. 4, and are shown installed in the silo of FIG. 5 in FIGS. 1, 2 and 3. The discharge chute forming means include an upright inwardly bowed door 36 vertically divided into segments 38 and 40 having a combined width greather than the width of opening 22. Each segment is narrow enough to be withdrawn through opening 22 by a person supported outside the silo within outside chute 28. The doors 36 are supported in place by U-shaped members 42, each pivotally attached to first and second brackets 44 and 46 attached to wall 12 on either side of opening 22. Fastening means 48, 50, 52 and 54 on the top and bottom edges of each door segment engage a vertically separated pair of U-shaped members 42 to support each door segment in place. As further explained below, at least one and preferably two rungs such as 56 and 58 are supported by each pair of brackets 44, 46, and successive pairs of brackets are arranged one above the other. The rungs attached the successive pairs of brackets 44, 46 define a ladder to allow a worker to ascend within outside chute 28 to erect and remove the doors or for any other reason.

Each door segment 38 has a side margin 60 which overlaps the side margin 62 of door segment 40, and the other door side margins 64, 66 seat against the inside wall of the silo when the door 36 straddles opening 22. Silage exerting an outward force against the convex surface 68 of the door cannot pass between the door segments or between the door and the silo wall. Rather, the outward pressure of silage acting against U-shaped members 42 contributes to the seating of side margins 64 and 66 against the silo wall. The fastening means 48, 50, 52 and 54 attached to each door segment are upward and downward opening hooks, respectively at the top and bottom of the door, to receive a pair of U-shaped members 42. One pair of brackets 44 and 46 is provided to straddle a pair of small openings 26.

Angle iron brackets 44 and 46 have hooks 70, 72 to engage a hoop 20 to hang the brackets in place. Bracket 46 has bosses 74 and 76 having vertical apertures for registration with apertures 78 and 80 in the ends of rungs 56 and 58 to receive a pivot rod 82. Rungs 56 and 58 pivot in a horizontal plane but ends 84, 86 of the rungs are permitted vertical play. Bracket 44 includes latch recesses 88 and 90 which engage ends 84 and 86 of the angle iron rungs to support the rungs in place. Due to the vertical play allowed rung ends 84 and 86, these ends can be lifted and withdrawn from recesses 88 and 90 and swung out of the way when door segments are removed through opening 22. Rungs 56 and 58 also are a safety feature to prevent a worker from falling into the silo discharge chute 32.

U-shaped members 42 each comprise a pair of legs 92, 94 joined by a bight portion 96. The legs have apertures 98 and 100 registered with apertures 102 and 104 in brackets 44 and 46 to receive pivot pins 106 and 108 to permanently link U-shaped member 42 to the brackets.

As best shown in FIG. 3, when the invention is installed in a silo U-shaped members 42 are prevented from rotating clockwise about pivot pins 106 and 108 by the interference of sills 24, and are normally prevented from rotating counterclockwise by the weight of the doors 36 they support. However, when the doors immediately above a particular member 42 have been removed, the member 42 supporting the uppermost door can pivot counterclockwise out of engagement with hooks 48 and 50 and entirely out of the discharge chute to a vertical attitude. This releases the next door in sequence. The discharge chute can thus be assembled from the bottom up before the silo is loaded or disassembled from the top down as the silo is unloaded.

FIG. 3 also shows an optional feature in which the bottom door 18' can be removed without releasing and removing the doors about it. Thus, even after the discharge chute has been erected a tool or other article dropped into the silo can be recovered. To provide this feature the lowermost support member 42' does not engage a sill, but instead is supported by a folding leg 110 pivotally attached at its upper end 112 to support member 42' and engaging floor 16 at its lower end 114 to keep support member 42' horizontal. To release just the bottom door, leg 110 is folded out of engagement with floor 16. Support member 42' can thus sag, releasing door 18' but not disturbing the other doors because support member 42" is constrained from sagging by sill 24'. Door 18' can be returned to its lowermost position by lifting the door into engagement with support means 42", raising support 42' into engagement with the door and erecting support leg 110.

It is evident from FIG. 2 that the size of door 36 is not critical so long as the span between margins 64 and 66 of the door is wider than opening 22. Thus particular discharge chute forming means according to the present invention can fit a wide variety of silo designs, and variations in silo dimensions due to settling or errors in construction can be accomodated. Yet, the construction provides a interior discharge chute with a strong wall to support the silage to prevent the chute from collapsing.

I claim:

1. In silo discharge chute forming means comprising:
   A. at least one inwardly bowed door for straddling an upright opening in the wall of a silo; and
   B. support means to removably support each door astride said opening;
   the improvements wherein:
   C. each door comprises at least two vertically divided segments having a combined width greater than the width of said opening and an individual width less than the width of said opening; and
   D. said support means for each door comprises a vertically registered pair of normally horizontally supported U-shaped members, each member having a pair of legs for pivotal attachment to said wall on each side of said opening and a bight normally extending radially inward and pivotally retractable radially outward through said opening, and fastening means fixed to the upper and lower ends of each door to engage the bights of said pair of U-shaped members.

2. The invention of claim 1, further comprising a vertically registered series of said doors, wherein the adjoining edges of each vertically adjacent pair of doors shares one of said U-shaped members for support.

3. The invention of claim 2, further comprising a movable leg having an upper end to support the lowermost said U-shaped member for said series of doors, a lower end for engaging a stationary portion of said silo, and means to disengage said lower end from said stationary portion to allow said bight to pivot below a horizontal plane, thereby releasing the lowermost door in said series without releasing the other doors in said series.

4. The invention of claim 3, wherein said movable leg is pivotally connected to said bight, whereby said leg can be swung upward away from said silo stationary portion to release said lowermost door.

5. The invention of claim 1, wherein the sides of each door are flared outward to form lips for sealing against the inside of said wall.

6. The invention of claim 1, wherein said means fixed to the upper and lower ends of each door to engage said U-shaped members respectively comprise at least one upward opening hook and at least one downward opening hook.

7. The invention of claim 1, wherein the legs of each U-shaped member are pivotally attached to first and second brackets for engaging the outside of said wall on the respective sides of said opening.

8. The invention of claim 7, wherein each said bracket is an elongate angle bracket for being fixed upright to said outside wall.

9. The invention of claim 8, further comprising at least one ladder rung supported at its first and second ends by said first and second brackets.

10. The invention of claim 9, wherein said first end of said rung is hinged for horizontal rotation about said first bracket and slight vertical play of said second end with respect to said second bracket, and said second end releasably engages an upward opening hook fixed to said second bracket.

11. The invention of claim 10, wherein plural rungs are supported by each pair of brackets.

12. The invention of claim 1, wherein said upright opening is subdivided into a series of regularly vertically spaced openings, each including a sill, and wherein at least one said sill form a stop to normally support the bight of at least one said U-shaped member horizontally within said silo.

* * * * *